US009777203B2

(12) United States Patent
Newsham et al.

(10) Patent No.: US 9,777,203 B2
(45) Date of Patent: Oct. 3, 2017

(54) SILICONE PRESSURE SENSITIVE ADHESIVE COMPOSITIONS AND PROTECTIVE FILMS CONTAINING THE SAME

(71) Applicant: Momentive Performance Materials Inc., Waterford, NY (US)

(72) Inventors: David Newsham, Round Lake, NY (US); Roy Griswold, Ballston Spa, NY (US); Jos Delis, Bergen op Zoom (NL)

(73) Assignee: Momentive Performance Materials, Waterford, NY (US)

( * ) Notice: Subject to any disclaimer, the term of this patent is extended or adjusted under 35 U.S.C. 154(b) by 0 days.

(21) Appl. No.: 14/733,178

(22) Filed: Jun. 8, 2015

(65) Prior Publication Data
US 2016/0355714 A1    Dec. 8, 2016

(51) Int. Cl.
| | |
|---|---|
| *C08G 77/08* | (2006.01) |
| *C09J 183/04* | (2006.01) |
| *C09J 7/02* | (2006.01) |
| *C09J 183/14* | (2006.01) |
| *C08L 83/04* | (2006.01) |
| *C08G 77/12* | (2006.01) |
| *C08G 77/20* | (2006.01) |

(52) U.S. Cl.
CPC ............ *C09J 183/04* (2013.01); *C08L 83/04* (2013.01); *C09J 7/0285* (2013.01); *C09J 183/14* (2013.01); *C08G 77/12* (2013.01); *C08G 77/20* (2013.01); *C09J 2467/006* (2013.01); *C09J 2483/00* (2013.01)

(58) Field of Classification Search
CPC ................................. C09J 183/04; C08L 83/04
See application file for complete search history.

(56) References Cited

U.S. PATENT DOCUMENTS

| | | | | |
|---|---|---|---|---|
| 4,061,609 A | * | 12/1977 | Bobear | C08L 83/04 523/212 |
| 4,539,357 A | * | 9/1985 | Bobear | C08L 83/04 524/267 |
| 4,774,297 A | * | 9/1988 | Murakami | C09J 183/04 525/478 |
| 5,064,916 A | * | 11/1991 | Sasaki | C08L 83/04 524/315 |
| 5,216,069 A | | 6/1993 | Kobori | |
| 6,121,368 A | | 9/2000 | Heying et al. | |
| 6,201,055 B1 | | 3/2001 | Lutz et al. | |
| 6,406,793 B1 | | 6/2002 | Aoki | |
| 6,562,180 B1 | | 5/2003 | Bohin et al. | |
| 6,811,650 B2 | | 11/2004 | Takuman et al. | |
| 7,592,070 B2 | | 9/2009 | Takanami et al. | |
| 7,659,003 B2 | | 2/2010 | Aoki et al. | |
| 7,687,591 B2 | | 3/2010 | Bhagwagar et al. | |
| 7,728,080 B2 | | 6/2010 | Aoki | |
| 8,057,909 B2 | | 11/2011 | Aoki et al. | |
| 8,128,773 B2 | | 3/2012 | Chun et al. | |
| 8,933,187 B2 | | 1/2015 | Griswold | |
| 2013/0150535 A1 | | 6/2013 | Griswold | |

FOREIGN PATENT DOCUMENTS

| | | |
|---|---|---|
| JP | 4678847 | 4/2011 |
| JP | 5032767 | 9/2012 |

OTHER PUBLICATIONS

Written Opinion and Search Report from International Application No. PCT/US2016/032694 dated Jul. 18, 2016.

\* cited by examiner

*Primary Examiner* — Margaret Moore
(74) *Attorney, Agent, or Firm* — James C. Abruzzo

(57) ABSTRACT

There is provided herein a silicone pressure sensitive adhesive composition comprising (A) a linear olefinically-functional polyorganosiloxane copolymer gum possessing a degree of polymerization in excess of 3,000; (B) a silicone resin including at least one $M^H$ unit and at least one Q unit; and, (C) a hydrosilylation catalyst, wherein the composition is in the substantial absence of low molecular weight siloxane having a degree of polymerization of less than 3,000 and wherein the composition has low peel adhesion to and clean removal from a substrate. There is also provided a protective film including the same as well as a method of making the protective film.

26 Claims, No Drawings

SILICONE PRESSURE SENSITIVE ADHESIVE COMPOSITIONS AND PROTECTIVE FILMS CONTAINING THE SAME

FIELD OF THE INVENTION

The present invention is directed to pressure sensitive adhesives (PSAs), more particularly the use of silicone pressure sensitive adhesives (SPSAs) in removable protective films for electronic components and electronic displays.

BACKGROUND OF THE INVENTION

Pressure sensitive adhesives are frequently utilized in removable protective films for glass and polymer surfaces, especially the displays in portable computers, cell phones, electronics, and their components. Protective films may be applied to and removed from these substrates during manufacturing, assembly, shipping, and final use.

In applications where a protective film is applied temporarily, it is critical that the film can be removed with low peeling force. If the protective film adheres too strongly to the substrate, removal can be difficult or cause damage to delicate surface features, such as printed designs or electronic traces. However, the film must also adhere to the substrate with sufficient strength to prevent accidental removal during normal handling.

Additionally, a removable protective film should not leave any residue upon removal. Transfer of the adhesive to the substrate may degrade the appearance of the surface or interfere with subsequent operations on the surface such as chemical treatment, printing, or bonding. Residues may be visible or invisible to the naked eye, in which case they can be detected by a variety of methods.

Further, a protective film should minimize the entrapment of air bubbles during application. Bubbles trapped between a protective film and substrate produce an unsightly and non-uniform construction that tends to increase the transfer of adhesive residue to the substrate. In order to reduce bubble entrapment, a protective film placed in contact with a substrate should form a PSA-substrate interface that advances across the surface or "wets" rapidly and spontaneously. It is advantageous if any entrapped bubbles can be easily removed from between the film and substrate by gentle application of pressure.

Currently, protective films are made using any one of acrylate, urethane, and silicone pressure sensitive adhesives. Silicone PSAs are generally the most expensive of the three technologies, but have superior surface wetting and high-temperature performance.

Silicone PSAs are provided as liquid mixtures of polydiorganosiloxanes that are blended, coated onto film face-stock, and cured during the production of a protective film construction. Silicone PSAs are normally cured by cross-linking via either organic peroxide initiated radical reaction, "peroxide cure" or metal catalyzed hydrosilylation, "addition cure." PSAs used in protective films are usually of the addition cure type.

While several silicone PSAs are available on the market, these materials leave detectable silicone residue on glass substrates, require excessive peeling force, or wet too slowly. Each of these technical difficulties causes their own problems in production and end-user quality. For example, silicone residue can be seen in the loss of paintability of glass substrates after hot aging in contact with the available PSAs.

SUMMARY OF THE INVENTION

The inventors herein have unexpectedly discovered a silicone pressure sensitive adhesive composition that provides for low peel adhesion, clean removal from a substrate and fast wetting.

In accordance with one embodiment of the present invention, there is provided herein a silicone pressure sensitive adhesive composition which comprises:

(A) a linear olefinically-functional polyorganosiloxane copolymer gum possessing a degree of polymerization in excess of 3,000;

(B) a silicone resin comprising at least one $M^H$ unit of the formula $M^H=R^1{}_2HSiO_{1/2}$ and at least one Q unit of the formula $Q=SiO_{4/2}$, where $R^1$ is a monovalent hydrocarbon radical of from 1 to 6 carbon atoms, more specifically methyl or ethyl, and in some embodiments, the upper end point of $R^1$ can be 3, 4 or 5 carbon atoms; and, (C) a hydrosilylation catalyst, wherein the composition is in the substantial absence of low molecular weight siloxane having a degree of polymerization of less than 3,000 and wherein the composition has low peel adhesion to and clean removal from a substrate.

In addition, there is provided in another embodiment, a protective film comprising a film face stock and a silicone pressure sensitive adhesive composition comprising component (A), (B), and (C) as described above and herein, wherein the composition is in the substantial absence of low molecular weight siloxane having a degree of polymerization of less than 3,000.

Further, there is provided herein a method of making a protective film comprising:

coating a film face stock, on at least one surface thereof, with the silicone pressure sensitive adhesive composition comprising components (A), (B), and (C) as described above, and herein, and then curing the coated film face stock.

DETAILED DESCRIPTION OF THE INVENTION

It has been surprisingly found that the use of a silicone pressure sensitive adhesive composition in the substantial absence of low molecular weight siloxane having a degree of polymerization of less than 3,000 can provide for silicone composition, and a protective film comprising a substrate and the silicone composition which has low adhesion (low peel force), low silicone residue and fast wetting.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification. It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

All measurements of viscosity as described herein are conducted at 25 degrees Celsius using rotational viscometry, e.g., a Brookfield viscometer.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

As used herein "consisting essentially of" in terms of the silicone pressure sensitive adhesive composition contains the linear olefinically-functional polyorganosiloxane copolymer gum possessing a degree of polymerization in excess of 3,000 (A), silicone resin (B) and hydrosilylation catalyst (C), as well as any optional components such as cure inhibitor, volatile organic solvent, reactive diluents, anchorage promoter, antioxidant, flame retardant, and the like.

As used herein "consisting of" in terms of the silicone pressure sensitive adhesive composition contains the linear olefinically-functional polyorganosiloxane copolymer gum possessing a degree of polymerization in excess of 3,000 (A), silicone resin (B) and hydrosilylation catalyst (C).

The term "gum" as regards the linear olefinically-functional polyorganosiloxane copolymer gum possessing a degree of polymerization in excess of about 3,000 is such that the component (A) has a viscosity of from about 300,000 to about 120,000,000, more specifically from about 1,000,000 to about 25,000,000 and most specifically from about 2,000,000 to about 4,000,000 cP.

The term "copolymer" as used herein, e.g. in component (A) is understood to mean a silicone material comprising at least a dimethylsiloxane D unit and a vinylmethylsiloxane $D^{vi}$ unit, each of these units potentially containing the respective functionalities described herein to the extent chemically possible, with the understanding that the silicone material may also optionally contain any one or more of vinyldimethylsiloxane $M^{vi}$, M, T or Q units wherein the respective functionalities of such M and T units are all methyl.

The "low" peel adhesion as described herein is understood to be the levels of peel adhesion described herein.

The "clean removal" from a substrate as described herein is understood to be the low level of silicone residue as described herein.

The expression "degree of polymerization" (DP) as used herein is defined as number of monomeric units in a macromolecule, an oligomer molecule, a block, or a chain, and as used herein shall be understood to refer to number-average molecular weight.

The expression "pressure sensitive" as regards "pressure sensitive adhesive", as used herein, is understood to refer to an adhesive which forms a bond when pressure is applied to marry the adhesive with the adherend, and wherein increasing levels of pressure provide for increasing levels of bonding up until the maximum level of bonding of the pressure sensitive adhesive material to the adherend. The various levels of bonding up through the maximum level of bonding of the silicone pressure sensitive adhesive composition described herein can in one non-limiting embodiment be quantitatively reflected by the peel adhesion to a substrate of the silicone composition as described herein, e.g., when the pressure is applied to the adhesive being adhered to a substrate of an article through the film face stock of the protective film being applied to the article, as described herein, at levels of from no pressure being applied, i.e., only the pressure intrinsic in the weight of the protective film being applied to a line pressure of about 5 kg per 24 mm, more specifically to about 3, kg per 24 mm and most specifically to about 1 kg per 24 mm being applied to the film face stock of the protective film. In one non-limiting embodiment herein, the pressure may be applied by a 2040 g, 24 mm roller.

In one non-limiting embodiment herein the linear olefinically-functional polyorganosiloxane copolymer gum (A) has a degree of polymerization of from about 4,000 to about 10,000, more specifically from about 5,000 to about 8,000, and most specifically from about 5,500 to about 7,500. In one non-limiting embodiment the linear olefinically-functional polyorganosiloxane copolymer gum (A) has a degree of polymerization of about 7,000.

The linear olefinically-functional polyorganosiloxane copolymer gum (A) contains sufficient olefinic moieties to react with the silyl-hydride moieties in silicone resin (B) as described herein during the curing of the same to form crosslinks between components (A) and (B) and transform the liquid polymer into a network solid with a rubbery consistency.

In one embodiment, the olefinic groups can be any olefinic group containing from 2 to about 12 carbon atoms, more specifically from 2 to about 6 carbon atoms, such as the non-limiting example of vinyl functionality. The olefinic groups can be located at chain ends, along the length of the chain, or both. For example, the linear olefinically-functional polyorganosiloxane copolymer gum (A) can contain at least one vinyldimethylsiloxane unit, at least one vinylmethyldisiloxane unit, and combinations thereof. In one more specific embodiment the linear olefinically-functional polyorganosiloxane copolymer gum (A) contains at least two olefinic moieties, preferably at least two vinyl moieties.

In one non-limiting embodiment, the linear olefinically-functional polyorganosiloxane copolymer gum (A) is such that from about 0.1 to about 13.0 mole percent, more specifically from about 0.1 to about 3.8 mole percent and most specifically from about 0.2 to about 1.0 mole percent of all monomer units in component (A) contains an olefinic group, preferably a vinyl group.

The linear olefinically-functional polyorganosiloxane copolymer gum (A) may be of such a viscosity as described herein, and preferably can be dispersed in a hydrocarbon solvent for coating. Some non-limiting examples of suitable hydrocarbon solvents include aliphatic hydrocarbon-based solvents such as hexane, heptane, octane, isooctane, decane, cyclohexane, methylcyclohexane and isoparaffin; ketone-based solvents such as acetone, methyl ethyl ketone, 2-pentanone, 3-pentanone, 2-hexanone, 2-heptanone, 4-heptanone, methyl isobutyl ketone, diisobutyl ketone, acetonylacetone and cyclohexanone; ester-based solvents such as ethyl acetate, propyl acetate, isopropyl acetate, butyl acetate and isobutyl acetate; ether-based solvents such as diethyl ether, dipropyl ether, diisopropyl ether, dibutyl ether, 1,2-dimethoxyethane and 1,4-dioxane; polyfunctional solvents such as 2-methoxyethyl acetate, 2-ethoxyethyl acetate, propylene glycol monomethyl ether acetate and 2-butoxyethyl acetate; siloxane-based solvent such as hexamethyldisiloxane, octamethyltrisiloxane, octamethylcyclotetrasiloxane, decamethylcyclopentasiloxane, tris(trimethylsiloxy)methylsilane and tetrakis(trimethylsiloxy)silane; and mixed solvents thereof.

The silicone resin (B) described herein can further comprise at least one M unit of the formula $M=R^1_3SiO_{1/2}$, wherein $R^1$ is a monovalent hydrocarbon radical of from 1 to 6 carbon atoms, more specifically methyl or ethyl, and $R^1$ can in some embodiments have an upper endpoint of 3, 4, or 5 carbon atoms.

In one non-limiting embodiment herein the silicone resin (B) can have the following general formula:

$$M_a M^H_b Q$$

wherein,
$M=R^1_3SiO_{1/2}$
$M^H=R^1_2HSiO_{1/2}$
$Q=SiO_{4/2}$,
wherein $R^1$ is a monovalent hydrocarbon radical of from 1 to 6 carbon atoms as described herein, and the subscripts a and b are each such that the silicone resin (B) has a ratio of M units to Q units of from about 0.6:1 to about 1.2:1, more specifically from about 0.7:1 to about 1.1:1 and most specifically from about 0.85:1 to about 1.0:1. In one non-limiting embodiment, the sum of a+b is about 1.

The silicone resin (B) described herein can be formed by the treatment of MQ resin wherein M and Q are silicone units as defined above, with a silyl-hydride treating agent of the general formula $(R^1)_dHSiX_{3-d}$, wherein $R^1$ is as defined above, and X is defined as $NH_2$, $NHR^1$, $NR^1_2$, $(NH)_{1/2}$, Cl, $O_{1/2}$, or $OR^1$, and where preferably $R^1$ is methyl, and d is 0.5 to 2.

In one non-limiting embodiment the silyl-hydride treating agent can be 1,1,3,3-tetramethyldisilazane, dimethylchlorosilane, and the like.

In one embodiment, the silicone resin (B) can further comprise at least one other silicone unit selected from the group consisting of T units of the formula $R^1SiO_{3/2}$, $T^H$ units of the formula $HSiO_{3/2}$, D units of the formula $R^1_2SiO_{2/2}$, and $D^H$ units of the formula $R^1HSiO_{2/2}$, wherein $R^1$ is as defined herein. The silicone resin (B) can preferably contain from about 50 to about 300 ppm hydride by weight, more specifically from about 150 to about 230 ppm hydride by weight, and most specifically from about 180 to about 200 ppm hydride by weight. In one specific embodiment herein the silicone resin (B) contains at least two silyl-hydride moieties.

In another embodiment herein, the silicone resin (B) has a viscosity of at least 5,000 cP.

The MQ resin to be treated with the silyl-hydride treating agent can be such that the copolymer comprises from about 0.5 weight % to about 5 weight % of hydroxyl radicals; wherein the hydroxyl radicals are bonded directly to the silicon atoms of the Q units; and after treatment the hydride radicals are bonded to the silicon atoms of the Q units via —OSiHR$^1_2$ radicals, wherein $R^1$ is a monovalent hydrocarbon radical having from 1 to 6 carbon atoms as defined herein. The MQ resin to be treated with the silyl-hydride treating agent can have an M/Q molar ratio of from about 0.4 to about 1.2, more specifically from about 0.5 to about 1.0 and most specifically from about 0.6 to about 0.9.

In one non-limiting embodiment herein the silicone resin (B) can be treated with a trimethylsiloxy ("M units") capping agent prior to reaction with the component (A) described herein. Suitable capping agents are represented by the formula $(R^6)_e SiX_{4-e}$, wherein each $R^6$ is independently a monovalent hydrocarbon radical having from 1 to 6 carbon atoms, and X is defined as $NH_2$, $NHR^1$, $NR^1_2$, $(NH)_{1/2}$, Cl, $O_{1/2}$, OH, or $OR^1$, and e is from about 0.5 to about 3.0.

Some exemplary capping agents include, but are not limited to, silazanes, disilazanes, and organo chlorosilanes. Examples include 1,1,1,3,3,3-hexamethyldisilazane, 1,1,1,3,3,3-hexamethyldisiloxane, (N,N-dimethylamino)trimethylsilane, trimethylmethoxysilane, trimethylchlorosilane, chlorotris(trimethylsilyl)silane, trimethylsilanol, triphenylchlorosilane, The amounts of components (A) and (B) described herein can be a sufficient amount to provide for curing by cross-linking as described herein. More specifically, amounts of components (A) and (B) described herein can be such that they provide a ratio of silyl-hydride in silicone resin (B) to silicon-olefin functionality in linear olefinically-functional polyorganosiloxane copolymer gum (A) is in a range of from about 0.25 to about 20, more specifically from about 1 to about 4 and most specifically from about 1.4 to about 2.0. At lower ratios, the adhesive may have reduced cohesive strength and removability. At higher ratios, the adhesion to surfaces may increase excessively over time. The concentration of SiH can be controlled by changing the amount of $(CH_3)_2HSiX$ capping agent used to produce resin (B). The molar ratio of SiH to olefin can then be controlled by changing the composition of gum or gums in (A).

In another embodiment, the ratio of the mass of silicone resin (B) to the mass of linear olefinically-functional polyorganosiloxane copolymer gum (A) is in a range of from about 0.1 to about 1.5, more specifically from about 0.1 to about 1.1, even more specifically from about 0.2 to about 1.1 and most specifically from about 0.55 to about 1.1. At lower ratios the adhesive may be brittle and demonstrate insufficient tack. At higher ratios, the adhesive may show poor surface wetting and demonstrate excessive tack.

The hydrosilylation catalyst (C) can include precious metal catalysts such as those which use ruthenium, rhodium, palladium, osmium, iridium, and platinum, and complexes of these metals. Examples of suitable hydrosilylation catalysts for use in the present invention include, but are not limited to: Ashby catalysts; Lamoreax catalysts; Karstedt catalysts; Modic catalysts; and Jeram catalysts and combinations thereof.

Advantageously, the hydrosilylation catalyst (C) used in the present invention is a platinum-containing catalyst. Suitable platinum-containing hydrosilylation catalysts include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds. In one non-limiting embodiment, the catalyst (C) is a ultraviolet (UV) light activated catalyst.

In one non-limiting embodiment, the hydrosilylation catalyst (C) is (methylcyclopentadienyl)trimethylplatinum(IV), which is activated by exposure to ultraviolet light.

The amount of catalyst component (C) that is used in the compositions of this invention varies, as long as there is a sufficient amount to accelerate a room temperature reaction between the silicon-bonded hydrogen atoms of component (B) with the silicon-bonded olefinic hydrocarbon radicals of component (A). The exact necessary amount of said catalyst component will depend upon the particular catalyst. That said, the amount can be, in one non-limiting embodiment, the amount of platinum-containing catalyst component sufficient to provide from about 5 to about 500 parts by weight platinum per one million parts by weight of the total weight of components (A) and (B).

In addition to the above components, the present silicone adhesive composition may comprise optional components. Examples of such components include cure inhibitor to prevent premature gelation, examples include diallyl maleate, 1-ethynylcyclohexan-1-ol, 2-methyl-3-butyn-2-ol, and Air Products' Surfynol® 61 (dimethylhexynol). The effective concentration depends on the desired bath life, but it is typically about 0.25%. Another optional component can be volatile organic solvent such as toluene, xylene, or heptane to adjust the viscosity of the mixture. The solvent is removed in a low-temperature drying step before curing the PSA. Solutions containing 40% to 70% solvent give viscosities suitable for roll coating, but the optimum concentration will depend on the viscosity of the selected gums and the limitations of the coating equipment. Yet another optional component can be a reactive diluent such as tetradecene or dodecyl vinyl ether. These diluents can be used to alter the adhesion and modulus of the PSA or to reduce the viscosity of the composition. Finally another optional component can be an anchorage promoter. Addition of Momentive AnchorSil® 2000 anchorage additive gives excellent anchorage to untreated PET film. Also, low molecular weight silicone hydrides like Momentive SilForce® SL6020 crosslinker or SilForce® SS4300C crosslinker provide anchorage to untreated PET. Reactive silanes such as triacetoxyvinylsilane, Momentive SilQuest® A-186 silane, as well as blends of silanes like Dow-Corning Sil-Off® 297 anchorage additive, or Wacker HF86 adhesion promoter also give excellent, permanent anchorage to corona-treated PET.

Some other further optional components can comprise non-reactive polyorganosiloxanes having no alkenyl group such as polydimethylsiloxane and polydimethyldiphenylsiloxane; antioxidants such as phenol type, quinone type, amine type, phosphorus type, phosphite type, sulfur type, and thioether type antioxidants; photostabilizers such as triazole type and benzophenone type photostabilizers; flame retardants such as phosphate ester type, halogen type, phosphorus type, and antimony type flame retardants; antistatic agents such as cationic surfactants, anionic surfactants, and nonionic surfactants; solvents for lowering the viscosity in application, for example, aromatic solvents such as toluene and xylene, aliphatic solvents such as hexane, octane and isoparaffins, ketones such as methyl ethyl ketone and methyl isobutyl ketone, esters such as ethyl acetate and isobutyl acetate, and ethers such as diisopropyl ether and 1,4-dioxane; and mixtures thereof; and dyes and pigments.

Optionally, the silicone PSA composition can be made by a process where the remaining SiOH functionality on the treated resin (B) is reacted in the presence of an organic amine catalyst and a vinyl siloxane gum (A).

As described above and herein, the silicone pressure sensitive adhesive composition is in the substantial absence of low molecular weight siloxane having a degree of polymerization of less than about 3,000. In one non-limiting embodiment herein the substantial absence of low molecular weight siloxane having a degree of polymerization of less than about 3,000 is an amount of less than about 5 weight percent, more specifically less than about 2 weight percent and most specifically less than about 0.9 weight percent. In a further embodiment herein, the substantial absence of low molecular weight siloxane having a degree of polymerization of less than about 3,000 can comprise the complete absence of low molecular weight siloxane having a degree of polymerization of less than about 3,000. In one non-limiting embodiment the lower endpoint of the degree of polymerization of the low molecular weight siloxane, of which the PSA composition is substantially absent is any one of 1, 2, 5, 10, 25, 50, 70, 90, 100, 250 and 500.

The silicone pressure sensitive adhesive composition described herein can have a peel adhesion to a substrate of from about 1 gf/inch to about 300 gf/inch, more specifically from about 5 gf/inch to about 100 gf/inch and most specifically from about 10 gf/inch to about 50 gf/inch. Peel adhesion can in one embodiment be measured by peeling 1 inch protective film tapes at an angle of 180 degrees and at a rate of 300 mm/minute from a glass substrate using an ATMI adhesion tester. In one embodiment, the substrate herein can be a glass substrate.

Further, as described above, the silicone pressure sensitive adhesive composition described herein does not leave a significant silicone residue on the substrate. Methods of detecting silicone residue can comprise visual inspection for haze or ghosting, contact angle measurement to determine the change in surface energy, subsequent adhesion testing to detect the presence of free silicone and SiH contamination, paintability testing to determine surface wettability, and infrared spectroscopy to detect changes in surface chemistry. More specifically, when the silicone pressure sensitive adhesive composition described herein is removed from a glass or polymer substrate, the silicone PSA composition leaves behind less residue than an equivalent composition which in fact does contain low molecular weight siloxane having a degree of polymerization of less than about 3,000 in an amount of greater than 5 weight percent, more specifically greater than about 1 weight percent based on the total weight of the silicone PSA composition.

In yet a further embodiment herein, there is provided a protective film comprising a film face stock and a silicone pressure sensitive adhesive composition containing components (A), (B) and (C), and the optional components described herein, wherein the composition is in the substantial absence of low molecule weights siloxane having a degree of polymerization of less than about 3,000 as described herein.

In yet an even further embodiment herein, silicone PSA composition and/or the protective film containing the same can have fast wetting when applied to the substrate, e.g., a glass or polymer substrate. The quantitative value of the fast wetting can depend on particular components (A), (B) and (C) as well as the particular substrate and the application/article in which it is employed. Preferably, the silicone PSA composition and/or the protective film has a faster wetting than an equivalent silicone pressure sensitive adhesive composition or equivalent protective film containing the silicone PSA wherein the silicone PSA contains low molecular weight siloxane having a degree of polymerization of less than about 3,000 in an amount of greater than 5 weight percent based on the total weight of the silicone PSA composition, more specifically greater than about 1 weight percent.

In another non-limiting embodiment, the protective film containing the silicone PSA composition described herein can have a probe tack of from about 30 g/cm$^2$ to about 600 g/cm$^2$, more specifically from about 40 g/cm$^2$ to about 500 g/cm$^2$, and most specifically from about 60 g/cm$^2$ to about 300 g/cm$^2$ as measured by a Polyken probe tack testing apparatus with an F weight, a dwell time of 1 second and a speed of 1 cm/second.

It will be understood herein that the low level of silicone residue of the silicone PSA composition herein provides for the fast wetting, improved paintability and low level of bubble formation described herein.

The film face stock of the protective film can comprise a plastic selected from the group consisting of polyester, poly(meth)acrylate, polycarbonate, polyethylene, polypropylene, polystyrene, polyamide, polyimide, polyphenylene sulfide, polytetrafluoroethylene, polyvinylchloride, polyurethane, triacetylcellulose, polyacetal, polynorbornene cycloolefinic resin, epoxy resin, phenolic resin, and combinations thereof. A thickness of the film face stock may be selected depending on plastic, but typically ranges from about 10 to about 300 μm, more typically from about 20 to about 200 μm.

The protective film described herein can be applied to an article, e.g., to protect a glass or polymer substrate on the article, such as the non-limiting example of an electronic display. The electronic display can be selected from the group consisting of a display in a portable computer, a display in a cell phone, and a display in an electronic device. Examples of such displays include CRT displays, liquid crystal displays, plasma displays, organic electroluminescence displays, inorganic electroluminescence displays, LED displays, Surface-Conduction Electron-emitter displays, Field Emission Display and touch panels using these displays. In another embodiment, the protective film can be applied to an article that is an electronic component, such as form example, an electronic component of any one of the aforementioned displays or internal or external components of such displays.

Since the protective film described herein comprises the film face stock and the silicone PSA described herein, when it is applied to an article, it is applied such that the silicone PSA, either cured or uncured is in contact with the glass or polymer substrate of the article and simultaneously with the film face stock. Upon curing of the silicone PSA material before or after application to the glass or polymer substrate of the article, the protective film can have a peel adhesion to the glass or polymer substrate such as those values described above for the silicone PSA composition.

As described above, there is provided herein a method of making a protective film comprising coating a film face stock, on at least one surface thereof, with the silicone pressure sensitive adhesive composition comprising components (A), (B), and (C), and any optional components as described above, and herein, and then curing the coated film face stock. To apply the silicone PSA composition onto the film face stock can be conducted by any known means or method, for example, by using a comma coater, a lip coater, a roll coater, a die coater, a knife coater, a blade coater, a rod coater, a kiss-roll coater, and a gravure coater; screen printing, dipping and casting methods. The amount of the silicone PSA composition to be applied on the film face stock may be such that a cured adhesive layer has a thickness of from about 2 to about 200 μm, particularly from about 3 to about 100 μm. The curing may be carried out using known means at a temperature of from about 80 to about 150° C. for about 30 seconds to about 30 minutes. The protective film made by the aforementioned method may then be applied to any of the articles described herein, preferably an electronic display, by pressing the protective film onto the article's substrate to be protected using known means, or by hand, preferably applying a pressure of from about 0.1 to about 10 psi. The removal of the protective film can require overcoming the peel adhesion force described herein, and can provide for the low level of silicone residue and fast wetting as described herein.

The invention may be better understood by reference to the following examples in which the parts and percentages are by weight unless otherwise indicated.

EXAMPLES

The pressure sensitive adhesives presented in the examples were prepared and evaluated using the following materials and techniques except where otherwise noted. 1,1,3,3-Tetramethyldisilazane, and hexamethyldisilazane were purchased from Gelest Inc. Surfynol® 61 (dimethylhexynol) was purchased from Air Products. Di(isopropylamino)dimethylsilane was purchased from abcr GmbH. (Methylcyclopentadienyl)trimethylplatinum(IV) was purchased from Sigma-Aldrich. Protective film samples were prepared by casting a 150 μm (6 mil) film of PSA solution onto a sheet of untreated 76 μm (3 mil) polyester film using a Gardner knife, allowing the solvent to evaporate for 20 minutes at ambient temperature, and curing in a 135° C. oven for 5 minutes to form a 50 μm (2 mil) film.

All viscosities are reported in centipoise and were measured at 25° C. using a Brookfield rotational viscometer. Peel adhesion was measured for 25 mm (1 inch) protective film tapes by peeling at an angle of 180° and a rate of 300 mm/minute from glass substrates using an ATMI adhesion tester.

Probe tack was measured with a dwell time of 1 s and a speed of 1 cm/s using a Polyken probe tack testing apparatus with an F weight.

Paintability was tested using a Sharpie® King Size permanent marker.

It is understood herein below that the M and $M^H$ units are such that the substituents of these units are methyl.

All the substituents on gums below are methyl except where vinyl is specifically indicated by the Vi superscript or Hydride is specifically indicated by the H superscript.

Example 1.1: $MM^HQ$ Resin Synthesis with HMDZ Capping

This example illustrates the synthesis of SiH functional $MM^HQ$ resin (B) and conversion of residual SiOH groups to trimethylsiloxy groups.

It is understood in the examples herein that the % OH of the MQ resins described are such that the Q units contain a small amount of SiOH functionality to provide for the noted % OH.

A solution of 916.6 g of MQ resin (2% OH, M/Q=0.7) in 585.6 of toluene (solution viscosity 5-7 cP) was charged into a 3 L three-neck round bottom flask under nitrogen and dried by azeotropic distillation. 18.1 g of 1,1,3,3-tetramethyldisilazane was added drop wise over 30 minutes and the reaction mixture was stirred for 60 minutes. 65.2 g of hexamethyldisilazane was then added to the pot and the mixture was stirred for another 60 minutes Ammonia was removed by thorough sparging with nitrogen until a moistened pH indicator strip placed into the reactor headspace remained neutral. Gasometric titration of the treated resin with butanol showed a final hydride concentration of 159 ppm (solids basis). Analysis of the resin by $^{29}Si$ NMR spectroscopy showed 1.6% OH and $M^H/Q$=0.02.

Example 1.2: $MM^HQ$ Resin Synthesis with High Hydride Content

This example illustrates the synthesis of SiH functional $MM^HQ$ resin (B) with a high concentration of hydride.

A solution of 2340 g of MQ resin (2% OH, M/Q=0.7) in 1560 g of toluene was charged into a 5 L three-neck round bottom flask under nitrogen and dried by azeotropic distillation. 212.7 g of 1,1,3,3-tetramethyldisilazane was added drop wise over 120 minutes. The reactor was fitted with a 12 inch, packed distillation column and head. Ammonia, unreacted tetramethyldisilazane, and other lights were removed by distillation. Gasometric titration of the treated resin with butanol showed a final hydride concentration of 650 ppm (solids basis).

Example 2.1: Very Low Adhesion Formulation

This example illustrates a PSA formulation prepared by blending two vinyl siloxane gums with the preferred degree of polymerization to reach the preferred vinyl concentration.

A silicone PSA was prepared by combining 537.3 g of treated MQ resin solution from Example 1.1 (60% solids), 16.04 g of $M^H_4Q_3$ resin, 1503 g of toluene, 1213 g of xylene, 999.1 g of vinyl siloxane gum having the formula $M^{Vi}D^{Vi}_{48}D_{4950}M^{Vi}$, 999.7 g of vinyl siloxane gum having the formula $M^{Vi}D^{Vi}_8D_{4990}M^{Vi}$, 3.198 g of hydride siloxane having the formula $MD^H_{33}D_{23}M$, and 2.442 g of 1-ethynylcyclohexan-1-ol in a high-shear mixer and blending for 120 minutes at 70° C. The final PSA contained 40.2% solids and had a viscosity of 38,000 cP. A sample of the PSA was catalyzed with 50 ppm platinum as Karstedt's catalyst and cured to give a tape with a peel adhesion of 2 gf/inch and a probe tack of 40 g/cm$^7$. When applied to glass substrates, the PSA showed fast surface wetting and facile bubble removal. Upon removal, paintability of the glass substrate remained excellent, indicating negligible silicone transfer.

Example 2.2: Very Low Adhesion Formulation with Gum Having Higher Degree of Polymerization This example illustrates a PSA formulation made with vinyl siloxane gum having the highest preferred degree of polymerization.

A silicone PSA was prepared by combining 366.7 g of treated MQ resin from Example 1.1 (60% solids), 11.0 g of $M^H_4Q_3$ resin, 2.2 g of hydride siloxane having the formula $MD^H_{30}D_{15}M$, 1853 g of toluene, and 1100 g of vinyl siloxane gum having the formula $MD^{Vi}_{44}D_{7000}M$ were combined in a high-shear mixed and blended for 90 minutes. The final PSA contained 41.8% solids and had a viscosity of 54,800 cP. A sample of the PSA was catalyzed with 100 ppm platinum as Karstedt's catalyst and cured to give a tape with a peel adhesion of 2 gf/inch. When applied to glass substrates, the PSA showed fast surface wetting and facile bubble removal. Upon removal, paintability of the glass substrate remained excellent, indicating negligible silicone transfer.

Example 2.3: Low Adhesion Formulation with $MM^HQ$ Resin Synthesis in Situ and Gum Having Lower Degree of Polymerization This example illustrates a PSA formulation made with vinyl siloxane gum having the lowest preferred degree of polymerization as well as the synthesis of SiH functional $MM^HQ$ resin in situ as well as the reaction of the resin in the presence of an organic amine catalyst.

A silicone PSA was prepared by combining 80.1 g MQ resin, 118.3 g of vinyl siloxane gum with the formula $M^{Vi}D_{3200}D^{Vi}_7M^{Vi}$), and 132.3 g of toluene in a 1 L round bottom flask. The mixture was stirred until homogeneous and 3.1 g of 1,1,3,3-tetramethyldisilazane was added drop wise. After 30 minutes, the mixture was heated to reflux and 0.1 g of di(isopropylamino)dimethylsilane was added. The mixture was refluxed for an additional 90 minutes. Gasometric titration of the mixture with butanol showed a final hydride concentration of 134 ppm (solids basis). The PSA was catalyzed with 100 ppm platinum as Karstedt's catalyst and cured to give a cohesive film with a peel adhesion of 341 gf/inch. When applied to glass substrates, the PSA showed slow surface wetting. Upon removal, the adhesive left no visible residue on the glass substrate.

Wetting was qualitatively measured against an arbitrary standard. "Fast" indicates performance equal to the best available commercial. "Slow" is the lowest speed where the film-substrate interface can be seen advancing spontaneously and continuously. "None" indicates that the film did not spontaneously wet the surface and required application of pressure to make a bond.

Example 2.4: Low Adhesion Formulation with Gum Having Lower Degree of Polymerization and Additional Crosslinker This example illustrates the effect of additional hydride siloxane crosslinker on the PSA from Example 2.3.

A silicone PSA was prepared by combining 20.0 g of the adhesive solution from Example 2.3 with 0.5 g of hydride silicone having the formula $MD^H_4D_{17}M$. The composition was catalyzed with 100 ppm platinum as Karstedt's catalyst and cured to give a tape with a peel adhesion of 101 gf/inch. When applied to glass substrates, the PSA showed slow surface wetting. Upon removal, the adhesive left no visible residue on the glass substrate.

Example 2.5: Low Adhesion Formulation

This example illustrates a PSA formulation prepared without an organic amine catalyst.

A silicone PSA was prepared by combining 286.2 g of treated resin solution from Example 1.1 (60% solids), 600.1 g of toluene, 150.0 g of vinyl siloxane gum with the formula $M^{Vi}D^{Vi}_{48}D_{4950}M^{Vi}$, 150.0 g of vinyl siloxane gum with the formula $M^{Vi}D^{Vi}_{8}D_{4990}M^{Vi}$, and 0.294 g of hydride siloxane with the formula $MD^{H}_{33}D_{23}M$ in a high-shear mixer and blending for 120 minutes at 70° C. The final PSA solution had a resin:gum ratio of 0.6:1. A sample of the adhesive was catalyzed with 50 ppm platinum as Karstedt's catalyst and cured to give a tape with a peel adhesion of 37 gf/inch. When applied to glass substrates, the PSA showed medium surface wetting. Upon removal, paintability of the glass substrate remained excellent, indicating negligible silicone transfer.

Example 2.6: Low-adhesion Formulation with Optional Condensation Process

This example illustrates the effect of an organic amine catalyst on the PSA from Example 2.5.

A silicone PSA was prepared by combining 296.3 g of adhesive solution from Example 2.5 with 0.23 g of dimethyldi(isopropylamino)silane and heating at 111° C. for 1 hour. A sample of the adhesive was catalyzed with 50 ppm platinum as Karstedt's catalyst and cured to give a tape with a peel adhesion of 55 gf/inch. When applied to glass substrates, the PSA showed medium surface wetting. Upon removal, paintability of the glass substrate remained excellent, indicating negligible silicone transfer.

Example 2.7: Low Adhesion Formulation with Resin:Gum Ratio of 1.1:1

This example illustrates a PSA formulation with the highest preferred resin:gum ratio.

A silicone PSA was prepared by combining 2516 g of treated resin solution from Example 1.1 (60% solids), 1511 g of toluene, 1809 g of xylene, 1031 g of vinyl siloxane gum having the formula $M^{Vi}D^{Vi}_{48}D_{4950}M^{Vi}$, 343.9 g of vinyl siloxane gum having the formula $M^{Vi}D^{Vi}_{4990}M^{Vi}$, 1.724 g of hydride siloxane having the formula $MD^{H}_{33}D_{23}M$, and 3.645 g 1-ethynylcyclohexan-1-ol in a high-shear mixer and blending for 120 minutes at 70° C. The final PSA solution had a viscosity of 4200 cP and a resin:gum ratio of 1.1:1. A sample of the PSA was catalyzed with 50 ppm platinum as Karstedt's catalyst and cured to give a tape with a peel adhesion of 126 gf/inch and a probe tack of 518 g/cm². When applied to glass substrates, the PSA showed slow surface wetting. Upon removal, paintability of the glass substrate remained excellent, indicating negligible silicone transfer.

Example 2.8: Very-low Adhesion Formulation with Low SiH and Higher Vinyl Content This example illustrates a PSA formulation with the lowest preferred resin:gum and SiH:vinyl ratios.

A silicone PSA was prepared by blending 3.3 g of treated resin solution from Example 1.2 (60% solids), 18.0 g of toluene, 10.0 g of vinyl siloxane gum having the formula $M^{Vi}D^{Vi}_{250}D_{6300}M^{Vi}$ (3.8 mol % vinyl), and 0.08 g of Surfynol 61. The final PSA solution had a resin:gum ratio of 0.2:1 and an SiH:vinyl ratio of 0.25:1. The PSA was catalyzed with 100 ppm platinum as Karstedt's catalyst and cured to give a tape with a peel adhesion of 6 gf/inch. When applied to glass substrates, the PSA showed fast surface wetting. Upon removal, there was no visible silicone residue on the glass substrate.

Example 2.9: Low Adhesion Formulation with Lower Vinyl Content

This example illustrates a PSA formulation made with vinyl siloxane gum having the lowest preferred vinyl content.

A silicone PSA was prepared by blending 3.3 g of treated resin solution from Example 1.2 (60% solids), 26.7 g toluene, 10.0 g of vinyl siloxane gum having the formula $M^{Vi}D^{Vi}_{4995}M^{Vi}$ (0.1 mol % vinyl), and 0.08 g of Surfynol 61. The PSA was catalyzed with 100 ppm platinum as Karstedt's catalyst and cured to give a tape with a peel adhesion of 127 gf/inch. When applied to glass substrates, the PSA showed fast surface wetting. Upon removal, there was no visible silicone residue on the glass substrate.

Example 2.10: Very-low Adhesion Formulation Cured Under UV Radiation

This example illustrates the use of a hydrosilylation catalyst that is activated by the application of ultraviolet light to cure the adhesive composition.

A silicone PSA was prepared by combining 4.37 g of treated MQ resin solution from Example 1.1 (60% solids), 0.14 g of $M^{H}_{4}Q_{3}$ resin, 12.24 g of toluene, 10.3 g of xylene, 6.71 g of vinyl siloxane gum having the formula $M^{Vi}D^{Vi}_{48}D_{4950}M^{Vi}$ 6.67 g of vinyl siloxane gum having the formula $M^{Vi}D^{Vi}_{8}D_{4990}M^{Vi}$, 0.02 g of hydride siloxane having the formula $MD^{H}_{33}D_{23}M$ and blending by hand at room temperature. The silicone adhesive composition was catalyzed with 30 ppm platinum as (methylcyclopentadienyl)trimethylplatinum(IV). Protective film samples were prepared by casting a 150 μm (6 mil) film of PSA solution onto a sheet of untreated 76 μm (3 mil) polyester film using a Gardner knife and allowing the solvent to evaporate for 20 minutes at ambient temperature before exposure to ultraviolet radiation from a medium pressure mercury vapor lamp with a power of 400 W/inch for 20 seconds. The cured tape had a peel adhesion of 3 gf/inch. When applied to glass substrates, the PSA showed fast surface wetting and facile bubble removal. Upon removal, paintability of the glass substrate remained excellent, indicating negligible silicone transfer.

Comparative Example 1.1

This example illustrates that the composition prepared according to Example 26 in U.S. Pat. No. 8,933,187 does not produce a PSA suitable for protective film applications.

In a 2 L round bottom flask, 230 g of vinyl siloxane gum having the formula $M^{Vi}D^{Vi}_{7}D_{3200}M^{Vi}$, 426 g of vinyl siloxane gum having the formula $M^{Vi}D_{800}M^{Vi}$, 110 g of vinyl siloxane fluid having the formula $M^{Vi}_{3}D_{95}T_{2.5}$, 1925 g of a 60% solution of MQ resin in toluene, and 105 g of 1-tetradecene were combined and heated to reflux at ca. 148° C. for 4 hours to remove water by azeotropic distillation. The temperature was reduced to 75° C. and 30.2 g of 1,1,3,3- tetramethyldisilazane was added to the mixture followed by 0.6 g of dimethyldi(isopropylamino)silane catalyst. After 2 hours, 200 g of toluene was added and the mixture was heated to reflux for 4 hours to remove water formed by the condensation reaction. The temperature was raised to 175° C. and held for 1 hour while solvent was removed. The mixture was cooled to room temperature and 5.0 g 1-ethynylcyclohexan-1-ol was added. The final composition contained 94.7% solids and 229 ppm hydride with a viscosity of 410,000 cP.

The composition was catalyzed with 25 ppm platinum as $Cl_2Pt(SEt_2)_2$, cast on 50 μm PET film, and cured at 130° C. to give a 50 μm adhesive film. The PSA had a peel force of 1922 gf/inch and showed no surface wetting or bubble release when applied to glass substrates. Upon removal, the PSA displayed legging and suffered partial cohesive failure. Paintability of the glass substrate was fair, indicating excessive silicone transfer.

Comparative Example 1.2

This example illustrates another composition prepared according to U.S. Pat. No. 8,933,187 with the addition of hydride siloxane crosslinkers as taught in Examples 26 through 30, which is not suitable for protective film applications. In a 12 L round bottom flask, 541 g of vinyl siloxane gum having the formula $M^{Vi}D^{Vi}{}_7D_{3200}M^{Vi}$, 1002 g of vinyl siloxane gum having the formula $M^{Vi}D_{800}M^{Vi}$, 386 g of vinyl siloxane fluid having the formula $M^{Vi}{}_3D_{95}T_{2.5}$, 6427 g of a 60% solution of MQ resin in toluene, and 294 g of 1-tetradecene were combined and heated to reflux at ca. 148° C. for 4 hours to remove 11 mL of water by azeotropic distillation. The temperature was reduced to 75° C. and 82.3 g of 1,1,3,3-tetramethyldisilazane was added to the mixture followed by 1.9 g of dimethyldi(isopropylamino)silane catalyst. After 2 hours, the mixture was heated to reflux for 4 hours to remove water formed by the condensation reaction. The mixture was cooled to room temperature and 212 g of hydride siloxane fluid with the structure $MD_{17}D^H{}_4M$, 22.3 g of hydride siloxane fluid with the formula $MD_{20}D^H{}_{10}M$, 63.9 g of hydride siloxane fluid with the formula $MD_{15}D^H{}_{30}M$, and 5.2 g 1-ethynylcyclohexan-1-ol were added. The final composition contained 92.7% solids and 271 ppm hydride with a viscosity of 39,700 cP. The composition was catalyzed with 25 ppm platinum as $Cl_2Pt(SEt_2)_2$, cast on 50 μm PET film, and cured at 130° C. to give a 4.5 mil adhesive film. The PSA had a peel force of 2155 gf/inch. When applied to glass substrates, the PSA showed no surface wetting or bubble release. Upon removal, the PSA displayed legging and suffered partial cohesive failure. Paintability of the glass substrate was fair, indicating excessive silicone transfer.

Comparative Example 1.3

This example illustrates a low adhesion composition prepared from the same materials as Comparative Example 1.2 that is not suitable for use in protective film applications.

In a 2 L round bottom flask, 230 g of vinyl siloxane gum having the formula $M^{Vi}D^{Vi}{}_7D_{3200}M^{Vi}$, 426 g of vinyl siloxane gum having the formula $M^{Vi}D_{800}M^{Vi}$, 252 G of vinyl siloxane fluid having the formula $M^{Vi}{}_3D_{95}T_{2.5}$, 800 g of a 60% solution of MQ resin in toluene, and 80 g of 1-tetradecene were combined and heated to reflux at ca. 148° C. for 4 hours to remove water by azeotropic distillation. The temperature was reduced to 75° C. and 30.2 g of 1,1,3,3-tetramethyldisilazane was added to the mixture followed by 0.2 g of dimethyldi(isopropylamino)silane catalyst. After 2 hours, 200 g of toluene was added and the mixture was heated to reflux for 4 hours to remove water formed by the condensation reaction. The temperature was raised to 175° C. and held for 1 hour while solvent was removed. The mixture was cooled to room temperature and 46.2 g of hydride siloxane fluid having the formula $MD_{17}D^H{}_4M$, 4.9 g of hydride siloxane fluid having the formula $MD_{20}D^H{}_{10}M$, 14.0 g of hydride siloxane fluid having the formula $MD_{15}D^H{}_{30}M$, and 5.0 g 1-ethynylcyclohexan-1-ol were added. The final composition contained 93.5% solids and 303 ppm hydride with a viscosity of 32,200 cP.

The composition was catalyzed with 25 ppm platinum as $Cl_2Pt(SEt_2)_2$, cast on 50 μm PET film, and cured at 130° C. to give a 50 μm adhesive film. The PSA had a peel force of 16 gf/inch and showed fast surface wetting and facile bubble removal when applied to glass substrates. After removal, the paintability of the glass substrate was poor, indicating excessive silicone transfer.

While the invention has been described with reference to a number of embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A silicone pressure sensitive adhesive composition comprising:
    (A) a linear olefinically-functional polyorganosiloxane copolymer gum possessing a degree of polymerization in excess of 3,000;
    (B) a silicone resin comprising at least one $M^H$ unit of the formula $M^H=R^1{}_2HSiO_{1/2}$ and at least one Q unit of the formula $Q=SiO_{4/2}$, where $R^1$ is a monovalent hydrocarbon radical of from 1 to 6 carbon atoms and contains from about 50 to about 300 ppm hydride by weight; and
    (C) a hydrosilylation catalyst,
    wherein the composition comprises less than about 5 weight percent of low molecular weight siloxane having a degree of polymerization of less than about 3,000 and wherein the composition has a peel adhesion to a substrate of from about 1 gf/inch to about 300 gf/inch and leaves less than 5% of silicone residue on the substrate.

2. The silicone pressure sensitive adhesive composition of claim 1 wherein the linear olefinically-functional polyorganosiloxane copolymer gum (A) has a degree of polymerization of from about 4,000 to about 10,000.

3. The silicone pressure sensitive adhesive composition of claim 1 wherein the linear olefinically-functional polyorganosiloxane copolymer gum (A) has a degree of polymerization of from about 5,000 to about 8,000.

4. The silicone pressure sensitive adhesive composition of claim 1 wherein the linear olefinically-functional polyorganosiloxane copolymer gum (A) comprises at least one vinyldimethylsiloxane unit, at least one vinylmethylsiloxane unit, and combinations thereof.

5. The silicone pressure sensitive adhesive composition of claim 1 wherein the linear olefinically-functional polyorganosiloxane copolymer gum (A) is such that from about 0.1 to about 13.0 mole percent of all monomer units in (A) contains an olefinic group.

6. The silicone pressure sensitive adhesive composition of claim 1 wherein the silicone resin (B) further comprises at least one M unit of the formula $M^{H'}=R^1_3SiO_{1/2}$, wherein $R^1$ is as defined.

7. The silicone pressure sensitive adhesive composition of claim 1 wherein the silicone resin (B) further comprises at least one other silicone unit selected from the group consisting of T units of the formula $R^1SiO_{3/2}$, $T^H$ units of the formula $HSiO_{3/2}$, D units of the formula $R^1_2SiO_{2/2}$, and $D^H$ units of the formula $R^1HSiO_{2/2}$.

8. The silicone pressure sensitive adhesive composition of claim 1 wherein the silicone resin (B) has a viscosity of greater than about 5,000 cps.

9. The silicone pressure sensitive adhesive composition of claim 1 wherein the molar ratio of silyl-hydride in silicone resin (B) to silicon-olefin functionality in linear olefinically-functional polyorganosiloxane copolymer gum (A) is in a range of from about 0.25 to about 20.

10. The silicone pressure sensitive adhesive composition of claim 1 wherein the ratio of the mass of silicone resin (B) to the mass of linear olefinically-functional polyorganosiloxane copolymer gum (A) is in a range of from about 0.1 to about 1.5.

11. The silicone pressure sensitive adhesive composition of claim 1 wherein the hydrosilylation catalyst is a platinum catalyst.

12. The silicone pressure sensitive adhesive composition of claim 1 wherein the hydrosilylation catalyst is a UV activated platinum catalyst.

13. The silicone pressure sensitive adhesive composition of claim 1 wherein the composition is in the absence of low molecular weight siloxane having a degree of polymerization of less than about 3,000.

14. The silicone pressure sensitive adhesive composition of claim 1 wherein the substrate is a glass substrate.

15. The silicone pressure sensitive adhesive composition of claim 1 wherein the removal of the composition from a glass substrate does not leave a silicone residue that is detectable by the naked eye.

16. A protective film comprising a film face stock and a silicone pressure sensitive adhesive composition comprising:
(A) a linear olefinically-functional polyorganosiloxane copolymer gum possessing a degree of polymerization in excess of about 3,000;
(B) a silicone resin comprising at least one $M^H$ unit of the formula $M^H=R^1_2HSiO_{1/2}$ and at least one Q unit of the formula $Q=SiO_{4/2}$, where $R^1$ is a monovalent hydrocarbon radical of from 1 to 6 carbon atoms and contains from about 50 to about 300 ppm hydride by weight; and
(C) a hydrosilylation catalyst,
wherein the composition comprises less than about 5 weight percent of low molecular weight siloxane having a degree of polymerization of less than about 3,000.

17. The protective film of claim 16 wherein the film face stock comprises a plastic selected from the group consisting of polyester, poly(meth)acrylate, polycarbonate, polyethylene, polypropylene, polystyrene, polyamide, polyimide, polyphenylene sulfide, polytetrafluoroethylene, polyvinylchloride, polyurethane, tri acetyl cellulose, polyacetal, polynorbornene cycloolefinic resin, epoxy resin, phenolic resin, and combinations thereof.

18. An article comprising the protective film of claim 16.

19. An article comprising a glass or polymer substrate and the protective film of claim 16.

20. An electronic display comprising a glass or polymer substrate and the protective film of claim 16.

21. The electronic display of claim 20 wherein the display is selected from the group consisting of a display in a portable computer, a display in a cell phone, and a display in an electronic device.

22. An electronic component comprising a glass or polymer substrate and the protective film of claim 16.

23. The article of claim 19 wherein protective film has a peel adhesion to the glass or polymer substrate of from about 1 gf/inch to about 300 gf/inch.

24. A method of making a protective film comprising:
coating at least one surface of a film face stock with a silicone pressure sensitive adhesive composition comprising:
(A) a linear olefinically-functional polyorganosiloxane copolymer gum possessing a degree of polymerization in excess of about 3,000;
(B) a silicone resin comprising at least one $M^H$ unit of the formula $M^H=R^1_2HSiO_{1/2}$ and at least one Q unit of the formula $Q=SiO_{4/2}$, where $R^1$ is a monovalent hydrocarbon radical of from 1 to 6 carbon atoms and contains from about 50 to about 300 ppm hydride by weight; and
(C) a hydrosilylation catalyst,
wherein the composition comprises less than about 5 weight percent of low molecular weight siloxane having a degree of polymerization of less than 3,000; and
curing the coated film face stock.

25. A protective film made by the process of claim 24.

26. A silicone pressure sensitive adhesive composition consisting essentially of:
(A) a linear olefinically-functional polyorganosiloxane copolymer gum possessing a degree of polymerization in excess of 3,000;
(B) a silicone resin comprising at least one $M^H$ unit of the formula $M^H=R^1_2HSiO_{1/2}$ and at least one Q unit of the formula $Q=SiO_{4/2}$, where $R^1$ is a monovalent hydrocarbon radical of from 1 to 6 carbon atoms and contains from about 50 to about 300 ppm hydride by weight; and
(C) a hydrosilylation catalyst,
wherein the composition comprises less than about 5 weight percent of low molecular weight siloxane having a degree of polymerization of less than about 3,000 and wherein the composition has a peel adhesion to a substrate of from about 1 gf/inch to about 300 gf/inch and leaves less than 5% of silicone residue on the substrate.

* * * * *